United States Patent
Xue et al.

(10) Patent No.: US 9,680,306 B2
(45) Date of Patent: Jun. 13, 2017

(54) WIND POWER GENERATION CONTROL DEVICE AND WIND POWER GENERATION SYSTEM HAVING THE SAME

(71) Applicant: DELTA ELECTRONICS,INC, Taoyuan (CN)

(72) Inventors: Haifen Xue, Taoyuan (CN); Li Chen, Taoyuan (CN); Fei Lu, Taoyuan (CN); Changyong Wang, Taoyuan (CN)

(73) Assignee: Delta Electronics, Inc., Taoyuan (CN)

( * ) Notice: Subject to any disclaimer, the term of this patent is extended or adjusted under 35 U.S.C. 154(b) by 0 days.

(21) Appl. No.: 14/972,667

(22) Filed: Dec. 17, 2015

(65) Prior Publication Data

US 2016/0177924 A1   Jun. 23, 2016

(30) Foreign Application Priority Data

Dec. 23, 2014   (CN) .......................... 2014 1 0811433

(51) Int. Cl.
| | |
|---|---|
| *F03D 9/00* | (2016.01) |
| *H02P 9/04* | (2006.01) |
| *H02J 3/38* | (2006.01) |
| *H02P 11/00* | (2006.01) |

(52) U.S. Cl.
CPC ............ *H02J 3/386* (2013.01); *Y02E 10/725* (2013.01); *Y02E 10/763* (2013.01)

(58) Field of Classification Search
CPC ...................................................... H02P 9/007
USPC ........................................ 322/28; 290/44, 55
IPC ....................................................... H02P 9/007
See application file for complete search history.

(56) References Cited

U.S. PATENT DOCUMENTS

| | | | | |
|---|---|---|---|---|
| 5,652,485 | A * | 7/1997 | Spiegel ................. | F03D 7/0272 318/147 |
| 7,253,537 | B2 * | 8/2007 | Weng ...................... | H02P 9/006 290/44 |
| 7,518,256 | B2 * | 4/2009 | Juanarena Saragueta | H02P 6/005 290/44 |
| 7,622,815 | B2 * | 11/2009 | Rivas ...................... | H02P 9/007 290/44 |
| 7,741,728 | B2 * | 6/2010 | Fortmann ............. | H02J 3/1885 290/44 |
| 7,834,472 | B2 * | 11/2010 | Rebsdorf .............. | F03D 7/0284 290/44 |

(Continued)

FOREIGN PATENT DOCUMENTS

| | | | |
|---|---|---|---|
| CN | 203151423 U | * | 8/2013 |
| CN | 203984196 U | * | 12/2014 |

*Primary Examiner* — Pedro J Cuevas
(74) *Attorney, Agent, or Firm* — Yunling Ren

(57) ABSTRACT

A wind power generation control device, coupled between a wind power generator and a power grid, includes a converter unit and a switching unit. The converter unit includes a generator-side converter, a DC bus capacitor and a grid-side converter, wherein an AC-side of the generator-side converter is coupled to a rotor-side of the wind power generator, a DC-side of the generator-side converter is coupled to the DC bus capacitor, a DC-side of the grid-side converter is coupled to the DC bus capacitor, and an AC-side of the grid-side converter is coupled to the power grid. The switching unit is configured to switch the wind power generation control device between the doubly-fed power generation operating mode and the full-power operating mode according to a wind speed. A wind power generation system uses the wind power generation control device.

20 Claims, 9 Drawing Sheets

(56) References Cited

U.S. PATENT DOCUMENTS

| | | | | |
|---|---|---|---|---|
| 7,999,418 B2 * | 8/2011 | Wang | H02J 3/01 | 307/151 |
| 8,247,917 B2 * | 8/2012 | Yasugi | H02P 9/10 | 290/44 |
| 8,400,003 B2 * | 3/2013 | Letas | H02J 3/18 | 290/44 |
| 8,593,114 B2 * | 11/2013 | Park | H02P 9/007 | 322/20 |
| 8,674,665 B2 * | 3/2014 | Sheng | H02P 9/007 | 290/44 |
| 8,922,173 B2 * | 12/2014 | Wang | H02P 6/00 | 290/44 |
| 9,362,837 B2 * | 6/2016 | Diedrichs | H02J 3/26 | |
| 9,461,572 B2 * | 10/2016 | Wessels | H02J 3/1885 | |
| 2003/0214823 A1 * | 11/2003 | Kawazoe | H02J 3/1885 | 363/37 |
| 2010/0117605 A1 * | 5/2010 | Kretschmann | H02P 9/007 | 322/28 |
| 2010/0156192 A1 * | 6/2010 | Wang | H02J 3/01 | 307/82 |
| 2010/0320762 A1 * | 12/2010 | Letas | H02J 3/18 | 290/44 |
| 2011/0260547 A1 * | 10/2011 | Wang | H02J 3/01 | 307/82 |
| 2011/0309875 A1 * | 12/2011 | Wei | H02M 1/32 | 327/482 |
| 2012/0061959 A1 * | 3/2012 | Yasugi | H02P 9/10 | 290/44 |
| 2013/0049707 A1 * | 2/2013 | Wang | H02P 6/00 | 322/21 |
| 2013/0057227 A1 * | 3/2013 | Aurtenetxea | H02H 7/06 | 322/28 |
| 2016/0211763 A1 * | 7/2016 | Wang | H02M 5/4585 | |
| 2016/0285399 A1 * | 9/2016 | Wang | H02P 9/007 | |

* cited by examiner

WIND POWER GENERATION CONTROL DEVICE AND WIND POWER GENERATION SYSTEM HAVING THE SAME

CROSS REFERENCE TO RELATED APPLICATIONS

The present application is based upon and claims priority to Chinese Patent Application No. 201410811433.5, filed on Dec. 23, 2014, the entire contents of which are incorporated herein by reference.

TECHNICAL FIELD

The present disclosure relates to a field of wind power generation, particularly to a wind power generation control device and a wind power generation system adaptable to environments with different wind speeds.

BACKGROUND

The conventional megawatt-level wind power generation system mainly includes two kinds of wind power generator sets, i.e., a full-power wind power generator set and a doubly-fed wind power generator set. In other words, one kind of the conventional wind power generator sets works in a doubly-fed generation mode, the other works in a full-power mode. In general, the full-power wind power generator set consists of a full-power converter and a full-power generator (e.g., a permanent magnet synchronous generator, an electrical excitation generator, and an induction generator), which has a wider operating range of power generation, a lower cut-in wind speed, and higher power generation efficiency, and good adaptability to a power grid. However, the full-power wind power generator and the full-power converter are expensive. The doubly-fed wind power generator set consists of a doubly-fed induction generator and a doubly-fed converter. Though the doubly-fed wind power generator has a lower price compared with the full-power generator set, the power generation efficiency is relatively poor at low wind speeds. Moreover, the doubly-fed motor has large electricity loss at low rotation speed, and due to the limitation of the operating voltage of transistors in the converter, the doubly-fed wind power generator will be restricted to the operating rotation speed threshold, and thus the doubly-fed wind power generator cannot work at an optimum tip-speed ratio in a low wind speed period, and its operating range of power generation is narrow.

SUMMARY

One aspect of the present disclosure is to provide a wind power generation control device of the present disclosure is coupled between a wind power generator and a power grid, including:

a converter unit including a generator-side converter, a DC bus capacitor and a grid-side converter, wherein an AC-side of the generator-side converter is coupled to a rotor-side of the wind power generator, a DC-side of the generator-side converter is coupled to the DC bus capacitor, a DC-side of the grid-side converter is coupled to the DC bus capacitor, and an AC-side of the grid-side converter is coupled to the power grid; and a switching unit for switching the wind power generation control device between the doubly-fed generation mode and the full-power mode according to a wind speed.

One aspect of the present disclosure is to provide a wind power generation system according to the present disclosure is coupled to a power grid, and includes:

a wind power generator; and a wind power generation control device coupled between the wind power generator and the power grid, for controlling a power flow direction between the wind power generation system and the power grid, wherein the wind power generation control device is the above-described wind power generation control device.

According to the present disclosure, under the control of the switching unit, the wind power generator may operate in a low wind speed operating mode and a middle or high wind speed operating mode. Thus, the present disclosure has the advantage of low cost of the doubly-fed generator set, and may achieve the full-power operating mode by the doubly-fed generator set in the low wind speed condition, thereby improve the power generating efficiency of the doubly-fed generator set at the low wind speed and solve the deficiency of narrow operating range of power generation.

DETAILED DESCRIPTION

In order to enable the person skilled in the art to better understand the present disclosure, the constitution content of the present disclosure will be described in detail by using embodiments of the present disclosure listed below in combination with the accompanying drawings. For convenience of description, the drawings of the present disclosure are only illustrative for easier understanding of the present disclosure, and its detailed proportion may be adjusted in accordance with the demand of design.

Figure 1:
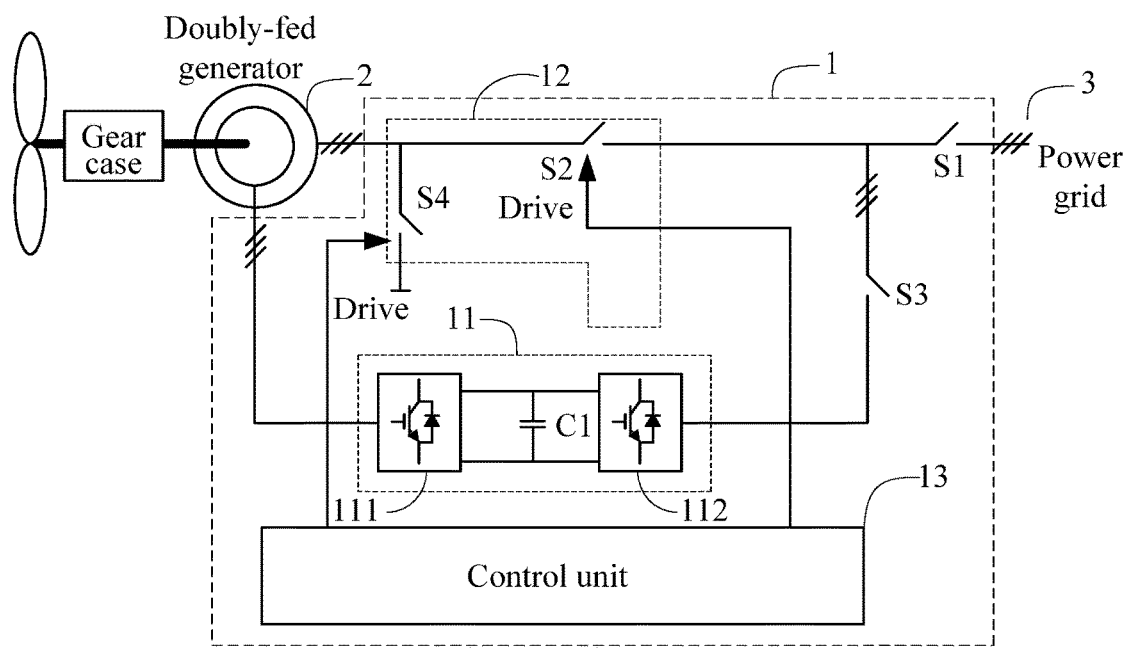
FIG. 1 is a schematic diagram of a wind power generation control device according to an embodiment of the present disclosure.

As shown in FIG. 1, in the present embodiment, a wind power generation control device 1 is coupled between a doubly-fed wind power generator 2 and a power grid 3. The wind power generation control device includes a converter unit 11 and a switching unit 12. The converter unit 11 includes a generator-side converter 111, a DC bus capacitor C1 and a grid-side converter 112. The AC-side of the generator-side converter 111 is coupled to a rotor-side of the wind power generator 2, and the DC-side of the generator-side converter 111 is coupled to the DC bus capacitor C1. The DC-side of the grid-side converter 112 is coupled to the DC bus capacitor C1, and the AC-side of the grid-side converter 112 is coupled to the power grid 3. The switching unit 12 is used to switch the wind power generation control device 1 between a doubly-fed generation mode and a full-power mode according to a wind speed. For example, when the current wind speed varies from one speed value to another speed value, the wind power generation control device 1 changes the wind power generator set's work state from the full-power mode to the doubly-fed generation mode.

In this embodiment, under condition of a low wind speed, power is supplied to the power grid only from the rotor-side, and the stator-side of the doubly-fed wind power generator 2 is shorted. In such mode, the doubly-fed wind power generator 2 works as an induction generator (IG), and the converter unit 11 operates in the full-power converter mode. The work state of the system is similar to that of the full-power generator set. The power flows from the converter unit 11 to the power grid 3. The converter unit 11 processes all the power output from the generator, which improves the operating efficiency at the low wind speed.

The operating mode switching of the switching unit 12 may be controlled by the control unit 13. The control unit 13 controls the switching unit 12 to switch between the full-power mode and the doubly-fed generation mode according to a control signal. In one embodiment, the control signal may be a switching instruction directly from a controller (not shown) of the doubly-fed wind power generator 2. Also, the control unit 13 may control the switching unit 12 according to a comparison result between wind speed data and predetermined wind speed data. Due to difference of the control signals, the control unit 13 may selectively be constructed to include the following two forms.

Figure 2A:
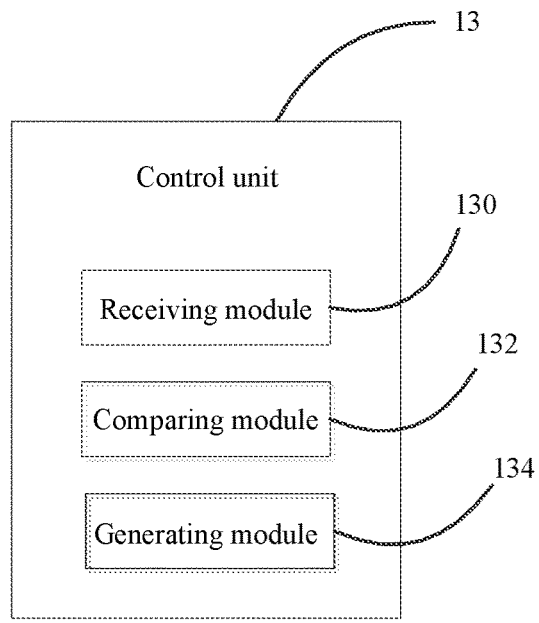
FIGS. 2a and 2b are schematic block diagrams illustrating structures of a control unit in the wind power generation control device according to an embodiment of the present disclosure.

As shown in FIG. 2a, in one embodiment, the control unit 13 may include a receiving module 130, a comparison module 132 and a generating module 134.

The receiving module 130 is configured to receive wind speed data, wherein the wind speed data may be transmitted by the controller (not shown) of the doubly-fed wind power generator 2. Alternatively, the wind speed data may be directly transmitted by a wind speed sensor (not shown).

The comparison module 132 is configured to compare the received wind speed data with a predefined wind speed data so as to generate a comparison result, wherein the predefined wind speed data is wind speed data stored in the control unit 13 or a storage unit (not shown) in advance, which is acquired by performing statistical calculation on the local wind speed circumstances, and may be selected to be greater than a predetermined cut-in rotation speed of the conventional doubly-fed generator set so as to avoid frequent switchover of the two modes near a low cut-in wind speed. By comparing the received wind speed data with the predefined wind speed data, the comparison module 132 determines that the current wind speed satisfies a first condition (a low wind speed condition), i.e., the currently received wind speed data is smaller than the predefined wind speed data, or determines that the current wind speed satisfies a second condition (a middle or high wind speed condition), i.e., the currently received wind speed data is equal to or greater than the predefined wind speed data, then the comparison module 132 sends the comparison result to a generating module 134.

The generating module 134 is configured to generate the control signal of switching to the full-power operating mode or the doubly-fed power generation operating mode according to the comparison result.

Figure 2B:
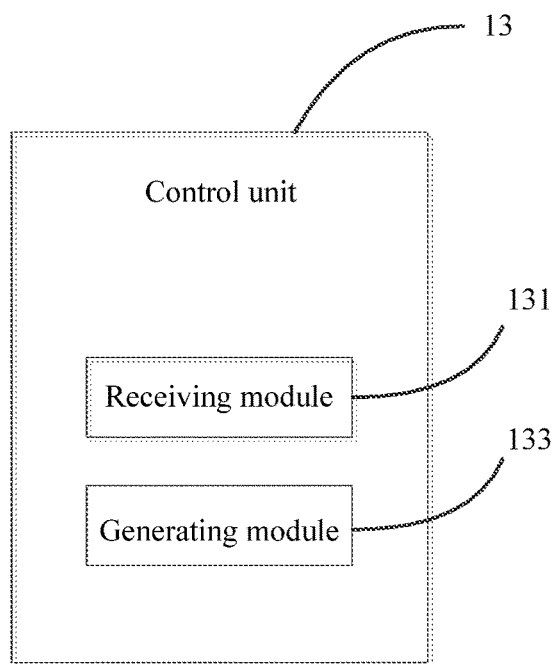

As shown in FIG. 2b, in another embodiment, the control unit 13 may include a receiving module 131 and a generating module 133.

The receiving module 131 is configured to receive a switching instruction, wherein the switching instruction is transmitted by the doubly-fed wind power generator 2, and instructs the switching unit 12 to switch to the full-power operating mode or the doubly-fed power generation operating mode.

The generating module 133 is configured to generate a control signal of switching to the full-power mode or the doubly-fed generation mode according to the switching instruction.

The main difference between structure of the control unit in the present embodiment and that in the previous embodiment lies in that: in the present embodiment, the receiving module 131 of the control unit 13 directly receives the switching instruction from the controller of the doubly-fed wind power generator 2, wherein the controller of the doubly-fed wind power generator 2 judges whether the wind speed reaches the first condition or the second condition and sends a corresponding switching instruction, then the control unit 13 directly switches to the full-power mode or the doubly-fed generation mode according to the switching instruction without judging the wind speed condition, which simplifies the control unit 13 to an extent, even may omit the control unit and control the switching unit only according to the outside control signal.

The switching unit 12 in the above embodiments may selectively include a mode changeover switch S4 and a grid-connecting switch S2.

The mode changeover switch S4 has a first end coupled to a stator-side of the wind power generator 2 and a first end of the grid-connecting switch S2, and has a second end which is shorten.

The first end of the grid-connecting switch S2 is coupled to the stator-side of the wind power generator 2, and a second end thereof is coupled to the power grid 3. The on and off of the mode changeover switch S4 correspond to the full-power operating mode and the doubly-fed power generation operating mode.

In addition, the wind power generation control device 1 further includes a grid-side switch S3 and a grid-entering switch S1.

A first end of the grid-side switch S3 is coupled to the grid-side converter 112, and a second end of the grid-side switch S3 and the second end of the grid-connecting switch S2 are coupled and form a common junction.

The grid-entering switch S1 is disposed between the common junction and the power grid 3.

Figure 3A:
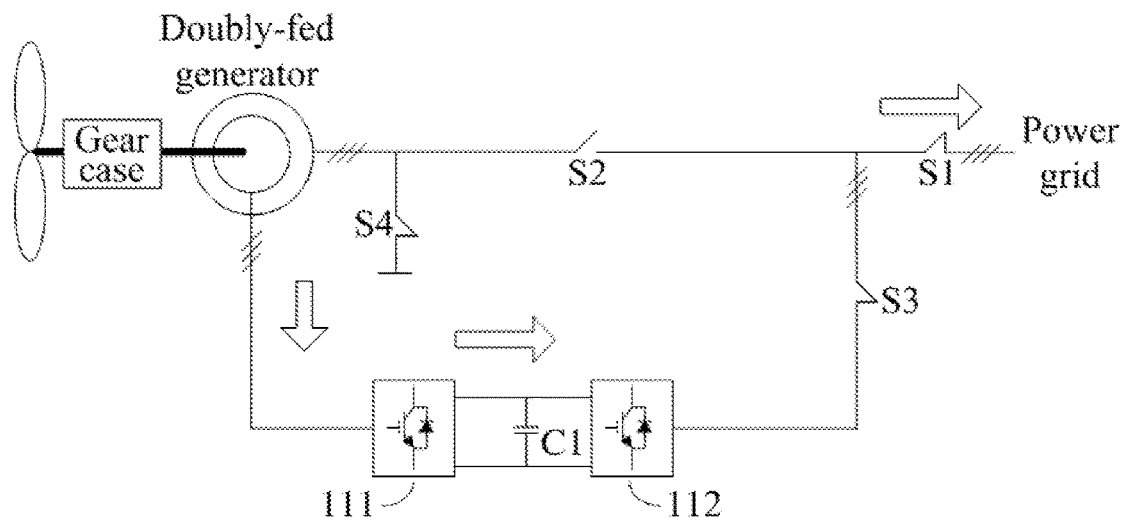
FIG. 3a is a schematic diagram illustrating that the wind power generation control device is in a low wind speed operating mode.

FIG. 3a illustrates a schematic diagram of the full-power operating mode, i.e., statuses of respective switches in a low wind speed operating mode. As shown in FIG. 3a, in this mode, the grid-entering switch S1, the grid-side switch S3 and the mode changeover switch S4 are turned on, the grid-connecting switch S2 is turned off, and by the turning on of the mode changeover switch S4, the stator part of the doubly-fed wind power generator 2 is shorten. In such mode, the doubly-fed wind power generator 2 becomes an induction generator (IG), and the converter unit 11 operates in a full-power converter mode. The operating condition of the system is similar to that of the full-power generator set. The grid-side converter 112 stabilizes the bus voltage across the DC bus capacitor, and adjusts the waveform of the current entering the grid; the generator-side converter 111 adjusts the output power, and the power flows from the rotor-side, through the generator-side converter 111 and the grid-side converter 112, then to the power grid 3. The generator-side converter 111 and the grid-side converter 112 process all the power output from the generator.

Figure 3B:
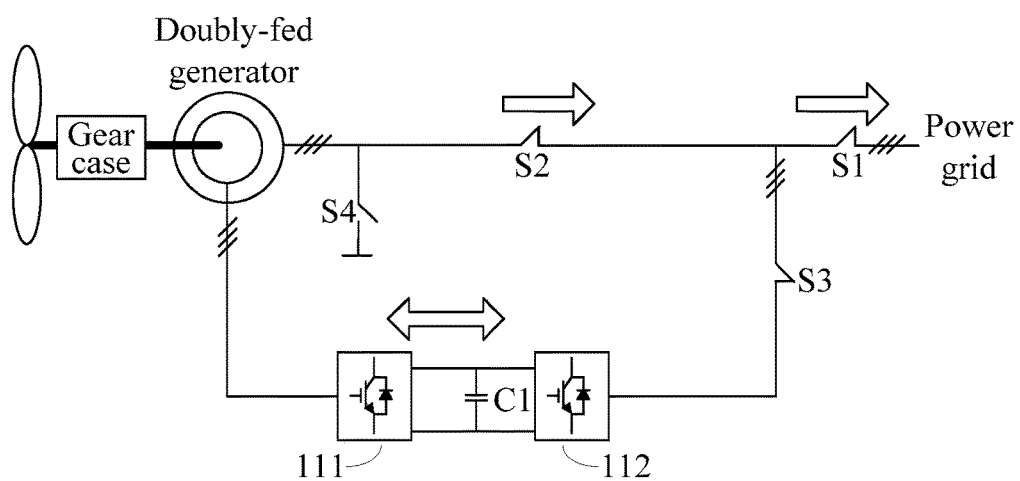
FIG. 3b is a schematic diagram illustrating that the wind power generation control device is in a middle or high wind speed operating mode.

FIG. 3*b* illustrates a schematic diagram of the doubly-fed power generation operating mode, i.e., statuses of respective switches in a middle or high wind speed operating mode. As shown in FIG. 3*b*, in this mode, the mode changeover switch S4 is turned off, the grid-entering switch S1, the grid-connecting switch S2, and the grid-side switch S3 are turned on, and the operating condition of the system is similar to that of the conventional doubly-fed wind power generator set. The grid-side converter 112 maintains the DC bus voltage to be constant, and the generator-side converter 111 controls the rotational direction and magnitude of the excitation field of the rotor winding according to the rotation speed and power, so as to achieve an operation with a variable speed and a constant frequency of the wind power generator. The stator-side of the doubly-fed generator 2 transmits power to the power grid 3, and the power flows between the grid-side converter 112 and the generator-side converter 111 bidirectionally according to the variation of the rotation speed of the wind power generator. When the rotation speed of the doubly-fed generator 2 exceeds the synchronous speed, the grid-side converter 112 and the generator-side converter 111 transmits power to the power grid 3; and when the rotation speed of the doubly-fed generator 2 is lower than the synchronous speed, the grid-side converter 112 and the generator-side converter 111 absorbs power from the power grid 3.

Figure 4:
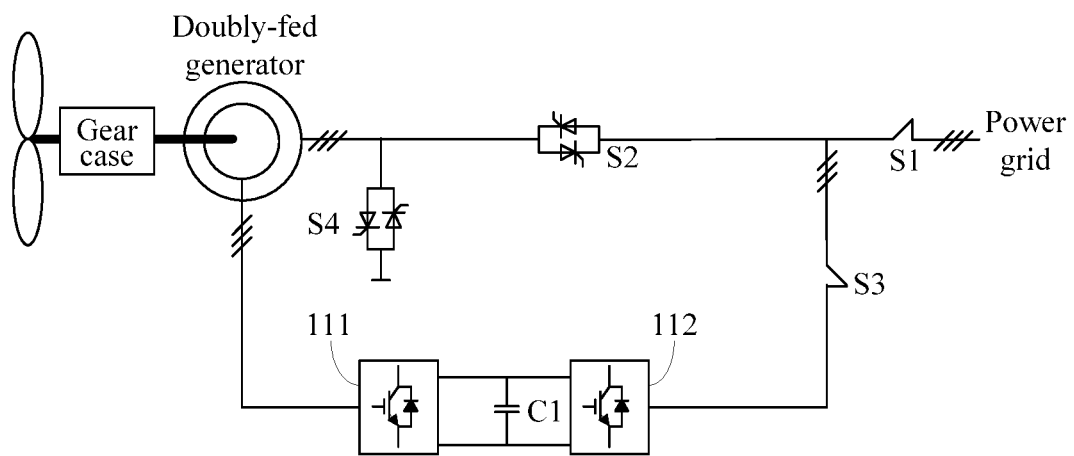
FIG. 4 is a schematic diagram of a wind power generation system using bidirectional electronic switches according to an embodiment of the present disclosure.
Figure 5:
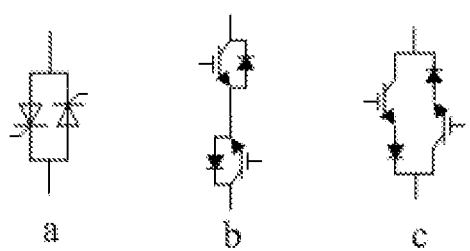
FIG. 5 is a schematic diagram of some types of the bidirectional electronic switches in FIG. 4.

Table 1 below shows switching logic statuses of switches S1-S4 in the above two operating modes. Generally, the switches may adopt mechanical switches, such as contactors, a Breaker, etc. During the switching, the mechanical switch needs a relative long off-on time (20 ms-200 ms). In order to reduce the switching time, a bidirectional electronic switch may be adopted to replace the mechanical switch. FIG. 4 is a schematic diagram of adopting a bidirectional SCR (Silicon Controlled Rectifier) electronic switch as the grid-connecting switch S2 and the mode changeover switch S4, by which the switching time may be reduced to be within 20 ms. FIG. 5 is a schematic diagram of several optional bidirectional electronic switches (a), (b) and (c), but the types of the bidirectional electronic switch are not limited thereto.

TABLE 1

|  | S2 | S4 | S1 | S3 |
|---|---|---|---|---|
| Low speed operating mode (IG mode) | 0 | 1 | 1 | 1 |
| Middle or high speed operating mode (DFIG mode) | 1 | 0 | 1 | 1 |

Figure 6:
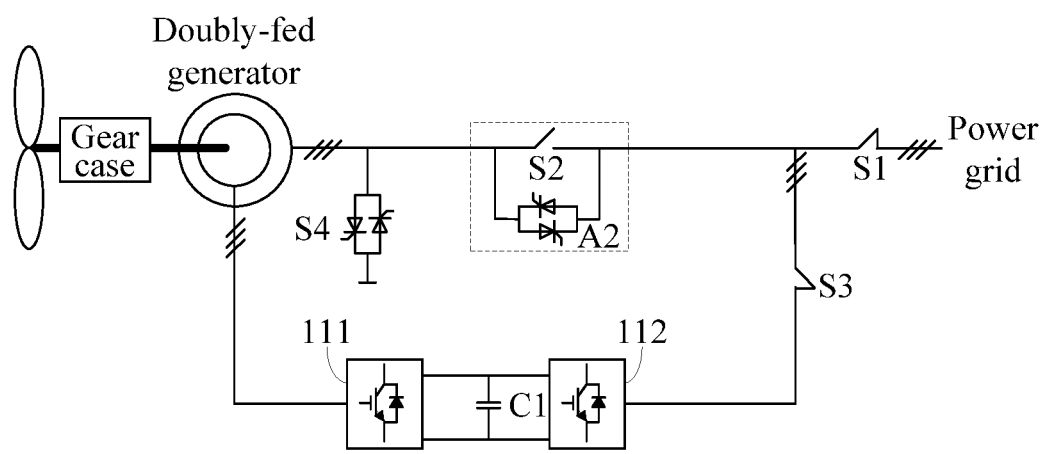
FIG. 6 is a schematic diagram of a wind power generation system using an compounded switch according to an embodiment of the present disclosure.

As shown in FIG. 6, the grid-connecting switch S2 may adopt a compounded switch, i.e., adopt the manner of connecting the mechanical switch S2 and an electronic switch A2 in parallel. The compounded switch has both advantage of being capable of carrying large current owed by the mechanical switch and advantage of quick switching owed by the electronic switch. By cooperating with corresponding switching logic control, the compounded switch may achieve seamless handover between the two modes.

In the low speed operating (IG) mode, the mechanical switch S2 is turned off, the bidirectional electronic switch A2 is turned off, and the mode changeover switch S4, the grid-entering switch S1 and the grid-side switch S3 are turned on. When switching to the doubly-fed mode, the bidirectional electronic switch A2 is turned on first, then the mode changeover switch S4 is turned off, and the grid-connecting mechanical switch S2, the grid-entering switch S1 and the grid-side switch S3 maintain the previous statuses. Since both the grid-connecting bidirectional electronic switch A2 and the mode changeover switch S4 are bidirectional electronic switch, the status switching is completed immediately, thus the handover from the IG mode to the doubly-fed mode is achieved. The grid-connecting bidirectional electronic switch A2 bears the stator current for a short time, then the grid-connecting mechanical switch S2 is turned on, at this time, the grid-connecting mechanical switch S2 and the grid-connecting bidirectional electronic switch A2 operate in parallel. Since impedance of the grid-connecting mechanical switch S2 is relative small, most of the stator current flows through the grid-connecting mechanical switch S2, and the grid-connecting bidirectional electronic switch A2 bears relative small load current, which reduces the usage cost of the bidirectional electronic switch. After the grid-connecting mechanical switch S2 is turned on, the grid-connecting bidirectional electronic switch A2 is turned off, and the grid-connecting mechanical switch S2 bears the whole stator current independently. Then, the entire switching procedure is ended.

Similarly, in the middle or high speed operating (DFIG) mode, the grid-connecting mechanical switch S2 is turned on, the grid-connecting bidirectional electronic switch A2 is turned off, the grid-entering switch S1 and the grid-side switch S3 are turned on, and the mode changeover switch S4 is turned off. When switching to the IG mode, the grid-connecting bidirectional electronic switch A2 is turned on first, the mode changeover switch S4 is turned on, and the grid-connecting mechanical switch S2, the grid-entering switch S1 and the grid-side switch S3 maintain the previous statuses. At this time, the grid-connecting mechanical switch S2 and the grid-connecting bidirectional electronic switch A2 operate in parallel. Since an impendence of the grid-connecting mechanical switch S2 is relative small, most of the stator current flows through the grid-connecting mechanical switch S2, and the grid-connecting bidirectional electronic switch A2 bears relative small load current. Then, the grid-connecting mechanical switch S2 is turned off, and the grid-connecting bidirectional electronic switch A2 bears the whole stator current for a short time. And then, the mode changeover switch S4 is turned on, and the grid-connecting bidirectional electronic switch A2 is turned off. Since both the grid-connecting bidirectional electronic switch A2 and the mode changeover switch S4 are the bidirectional electronic switch, the status handover is completed immediately, thus switching from the doubly-fed mode to the IG mode is achieved, and then the entire switching procedure is ended. The following Table 2 shows switching logic statuses of respective switches in the wind power generation system adopting the compounded switch.

TABLE 2

| | S2 | A2 | S4 | S1 | S3 |
|---|---|---|---|---|---|
| Low speed operating mode (IG mode) | 0 | 0 | 1 | 1 | 1 |
| Middle or high speed operating mode (Doubly-fed mode) | 0 | 1 | 0 | 1 | 1 |
| | 1 | 1 | 0 | 1 | 1 |
| | 1 | 0 | 0 | 1 | 1 |

Figure 7:
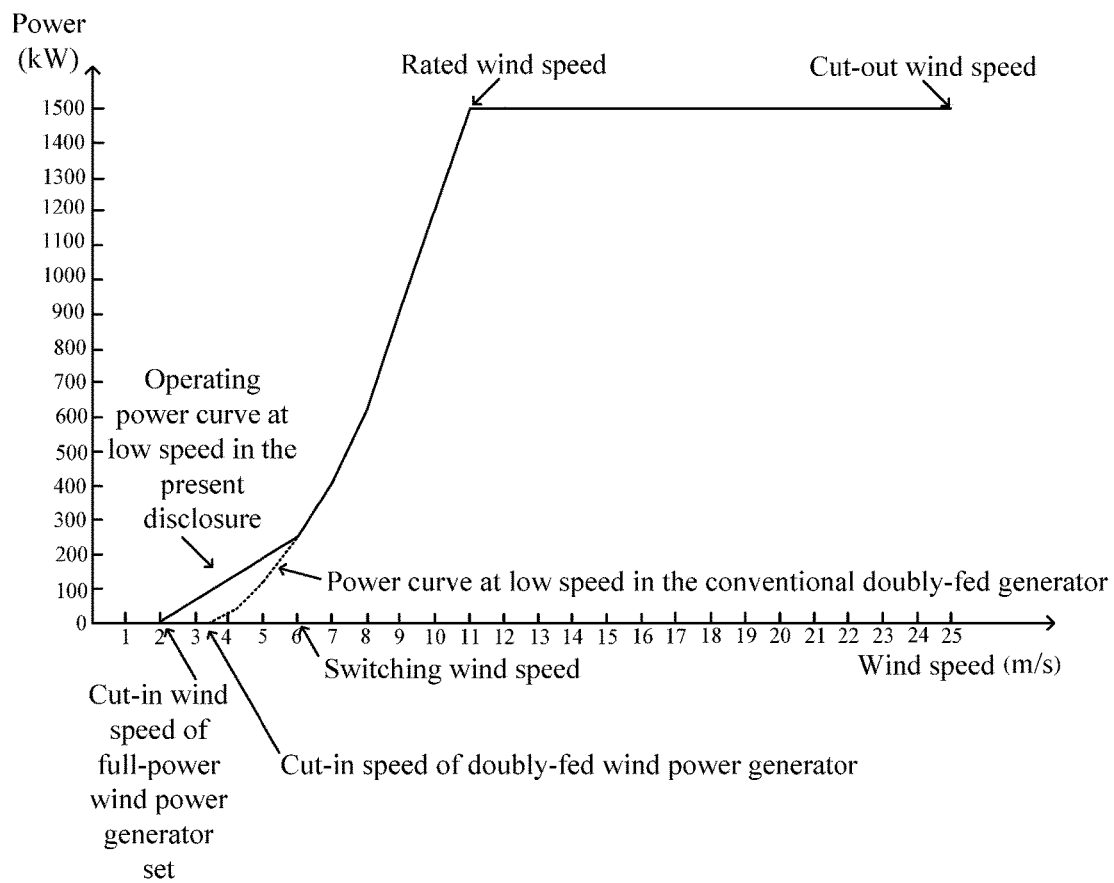
FIG. 7 is a schematic diagram illustrating operating power curves at different wind speeds of a wind power generator according to the present wind power generation system and the conventional doubly-fed wind power generation system.

In order to disclose the present disclosure more clearly, hereinafter, the detailed depictions are given by using a power curve diagram. FIG. 7 is a schematic diagram of power curves of the wind power generator set in the present disclosure at respective wind speeds, wherein the solid line portion indicates an operating power curve of the wind power generator of the present disclosure, and the dotted line portion indicates an operating curve of the conventional doubly-fed generator. As shown in FIG. 7, in the middle or high wind speed section (>6 m/s), two curves are overlapped. The difference between the two curves lies in the low wind speed section, and the operating power curve of the present disclosure is apparently more advanced. Taking the 1.5 MW doubly-fed wind power generation system as an example, the cut-in wind speed of the conventional doubly-feed generator system is about 3.4 m/s, before the wind speed reaches the rated wind speed, the wind power generation control system controls a windward angle of the paddle to make the generator system output the maximum power as large as possible, and after the wind speed reaches the rated wind speed, by controlling the variation of the windward angle of the paddle, a constant power output of the generator system is maintained. In the present disclosure, before the wind speed reaches the switching wind speed, by switching the corresponding switches, and the coordination control system of the grid-side and generator-side converter operating in the full-power operating mode (low speed operating mode), the cut-in wind speed in the full-power operating mode is far below than that in the conventional doubly-fed generator system. After the wind speed reaches the switching wind speed, the system switches to the doubly-fed operating mode (middle or high speed operating mode).

According to standard requirements of power companies in many countries, the grid-connecting generating device of high power wind power needs a FRT function, i.e., when a failure, such as a short circuit, is occurred in the power grid, the generating device needs to maintain the grid-connecting status within a prescribed time, and protectively detaching from the grid is not permitted. Meanwhile, a certain reactive current may be generated so as to support voltage of the power grid system. Since in the present disclosure, there are two different operating modes, i.e., the low speed mode and the middle or high speed mode, it is necessary to consider that such requirements may be satisfied in different operating mode.

Figure 8:
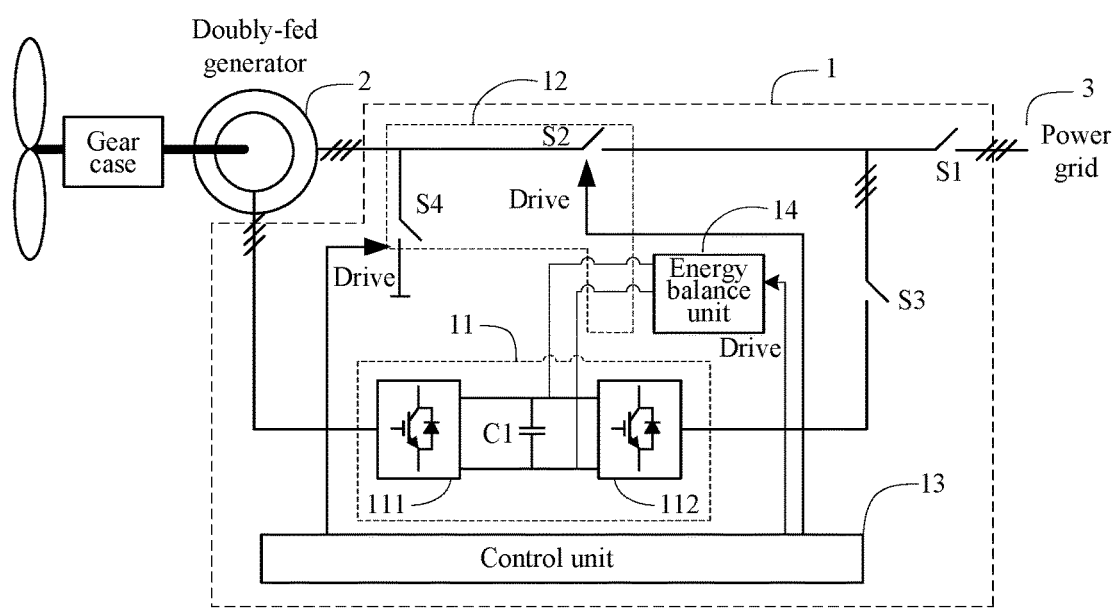
FIG. 8 is a schematic diagram illustrating the wind power generation control device with a FRT (Fault ride-through) function according to an embodiment of the present disclosure.
Figure 9:
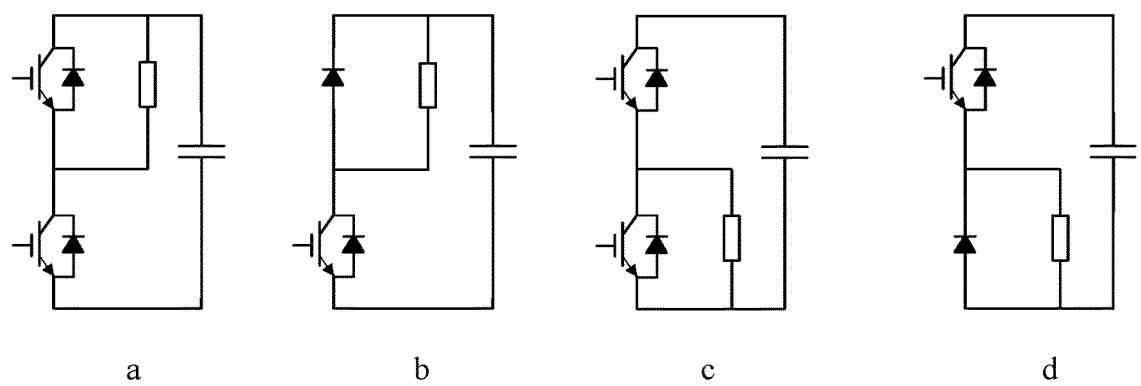
FIG. 9 is a schematic structural diagram of several kinds of DC (Direct Current) choppers in the wind power generation control device in FIG. 8.

FIG. 8 is a schematic diagram of a control system having the FRT (Fault Ride-Through) function according to an embodiment of the present disclosure. As shown in FIG. 8, by connecting an energy balance unit 14 at the DC bus-side of the converter, the bus voltage fluctuation caused by energy unbalance with grid failure may be excellently solved, so as to protect the electronic components of the converter, thus the FRT function of the present disclosure is achieved. The energy balance unit 14 may selectively be a DC chopper, which is coupled between a first end and a second end of the capacitor C1. FIG. 9 shows schematic diagrams of several topologies of DC choppers (a), (b), (c) and (d). The DC chopper includes a DC chopping bridge arm and an energy releasing resistor, and the DC chopping bridge arm may be realized in various forms, and may be consisted of IGBT and Diode. The releasing resistor may also be connected between the positive bus and the middle point of the bridge arm, or between the negative bus and the middle point of the bridge arm.

In the IG mode, when the short circuit failure occurs in the power grid, in addition to stabilize the DC bus voltage as normal, the grid-side converter 112 also needs to generate a reactive current according to a voltage drop amplitude, so as to support the voltage of the power grid. The DC chopper is turned on or off according to the magnitude of the DC bus voltage, so as to maintain the energy balance between the generator-side converter 111 and the grid-side converter 112.

In the DFIG mode, when the short circuit failure occurs in the power grid, the grid-side converter 112 stabilizes the DC bus voltage, and the generator-side converter 111 generates a reactive current from the stator-side according to a voltage drop amplitude, so as to support the voltage of the power grid. The DC chopper is turned on or off according to the magnitude of the DC bus voltage, so as to maintain the energy balance between the generator-side converter 111 and the grid-side converter 112.

As shown in FIG. 1, the wind power generation system according to an embodiment of the present disclosure is coupled to a power grid 3, and the wind power generation system includes a wind power generator 2, and wind power generation control device 1. The wind power generation control device 1 is coupled between the wind power generator 2 and the power grid 3 for controlling power transmission between the wind power generator 2 and the power grid 3.

In the wind power generation control device 1, a converter unit 11 includes a generator-side converter 111, a DC bus capacitor C1 and a grid-side converter 112, wherein an AC-side of the generator-side converter 111 is coupled to a rotor-side of the wind power generator 2, a DC-side of the generator-side converter 111 is coupled to the DC bus capacitor C1, a DC-side of the grid-side converter 112 is coupled to the DC bus capacitor C1, and an AC-side of the grid-side converter 112 is coupled to the power grid 3. A switching unit 12 is used to switch the wind power generation control device 1 between a doubly-fed power generation mode and a full-power mode according to a wind speed.

The structures and operating modes of the control device 1 in the present embodiment have been explained in detail in the above embodiment, which is not repeated herein.

The exemplary embodiments of the present disclosure have been specifically illustrated and described as above. It should be understood that the present disclosure is not limited in the details on embodiments, but intends to cover various variations and equivalent replacements within the scope of the accompanying claims.

What is claimed is:

1. A device for controlling a wind power generator, the device being coupled between the wind power generator and a power grid, comprising:
a converter unit comprising a generator-side converter, a DC bus capacitor and a grid-side converter, wherein an AC-side of the generator-side converter is coupled to a rotor-side of the wind power generator, a DC-side of the generator-side converter is coupled to the DC bus capacitor, a DC-side of the grid-side converter is coupled to the DC bus capacitor, and an AC-side of the grid-side converter is coupled to the power grid;

a switching unit configured to switch the operation mode of the device between a doubly-fed generation mode and a full-power mode according to a wind speed; and an energy balance unit configured to maintain an energy balance of the wind power generation system when a short circuit failure occurs in the power grid, so as to maintain the grid to be connected within a predefined period and generate a reactive current.

2. The device according to claim 1, the switching unit comprising a first switch and a second switch, wherein
a first end of the first switch is coupled to a stator-side of the wind power generator and a first end of the second switch, a second end of the first switch is shorten;
the first end of the second switch is coupled to the stator-side of the wind power generator, and a second end of the second switch is coupled to the power grid.

3. The device according to claim 2, further comprising a third switch and a fourth switch, wherein
a first end of the third switch is coupled to the grid-side converter, a second end of the third switch and a second end of the second switch are coupled to form a common junction; and
the fourth switch is disposed between the common junction and the power grid.

4. The device according to claim 3, wherein upon the full-power mode, the second switch is turned off, and the first switch, the third switch and the fourth switch are turned on; and upon the doubly-fed generation mode, the first switch is turned off, and the second switch, the third switch and the fourth switch are turned on.

5. The device according to claim 2, wherein
each of the first switch and the second switch is an electronic switch, a mechanical switch or a compounded switch formed by the electronic switch and the mechanical switch.

6. The device according to claim 1, further comprising:
a control unit configured to control the switching unit to switch between a doubly-fed generation mode and a full-power mode according to a control signal.

7. The device according to claim 5, wherein the control unit comprises:
a receiving module configured to receive wind speed data;
a comparing module configured to compare the received wind speed data with predefined wind speed data so as to generate a comparison result; and
a generating module configured to generate the control signal according to the comparison result.

8. The device according to claim 5, wherein the control unit comprises:
a receiving module configured to receive a switching instruction; and
a generating module configured to generate the control signal according to the switching instruction.

9. The device according to claim 1, wherein when the device works in the doubly-fed generation mode, a first power-transmission path is formed between the stator-side of the wind power generator and the power grid, and a second power-transmission path is formed by the rotor-side of the wind power generator, the converter unit and the power grid; and when the device works in the full-power mode, a third power transmission path is formed by the rotor-side of the wind power generator, the converter unit and the power grid.

10. The device according to claim 1, wherein
the energy balance unit is a DC chopper coupled between a first end and a second end of the DC bus capacitor.

11. The device according to claim 10, wherein
when the short circuit failure occurs in the doubly-fed generation mode, the grid-side converter stabilizes a bus voltage across the DC bus capacitor, the generator-side converter generates the reactive current from the stator-side of the wind power generator according to a voltage drop amplitude, and the DC chopper turns on or turns off according to the bus voltage, so as to maintain an energy balance between the generator-side converter and the grid-side converter.

12. The device according to claim 10, wherein when the short circuit failure occurs in the full-power mode, the grid-side converter stabilizes a bus voltage across the DC bus capacitor, and generates a reactive current according to a voltage drop amplitude, so as to support a voltage of the power grid, and the DC chopper turns on or turns off according to the bus voltage, so as to maintain an energy balance between the generator-side converter and the grid-side converter.

13. A wind power generation system coupled to a power grid, comprising:
a wind power generator; and
a control device configured to control the wind power generator, coupled between the wind power generator and the power grid, which is used to control a power flow direction between the wind power generation system and the power grid,
wherein the control device is the control device according to claim 1.

14. The wind power generation system according to claim 13, wherein the switching unit comprises a first switch and a second switch, wherein
a first end of the first switch is coupled to a stator-side of the wind power generator and a first end of the second switch, a second end of the first switch is shorten; and
the first end of the second switch is coupled to the stator-side of the wind power generator, and a second end of the second switch is coupled to the power grid.

15. The wind power generation system according to claim 14, wherein the control device further comprises a third switch and a fourth switch, wherein
a first end of the third switch is coupled to the grid-side converter, a second end of the third switch and a second end of the second switch are coupled to form a common junction; and
the fourth switch is disposed between the common junction and the power grid.

16. The wind power generation system according to claim 15, wherein
upon the full-power mode, the second switch is turned off, and the first switch, the third switch and the fourth switch are turned on; and upon the doubly-fed generation mode, the first switch is turned off, and the second switch, the third switch and the fourth switch are turned on.

17. The wind power generation system according to claim 14, wherein
each of the first switch and the second switch is an electronic switch, a mechanical switch or a compounded switch formed by the electronic switch and the mechanical switch.

18. The wind power generation system according to claim 13, the energy balance unit is a DC chopper coupled between a first end and a second end of the DC bus capacitor.

19. The wind power generation system according to claim 18, wherein when the short circuit failure occurred in the doubly-fed generation mode, the grid-side converter stabilizes a bus voltage across the DC bus capacitor, the generator-side converter generates the reactive current from the stator-side of the wind power generator according to a voltage drop amplitude, and the DC chopper turns on or turns off according to the bus voltage, so as to maintain an energy balance between the generator-side converter and the grid-side converter.

20. The wind power generation system according to claim 18, wherein when the short circuit failure occurs in the full-power mode, the grid-side converter stabilizes a bus voltage across the DC bus capacitor, and generates a reactive current according to a voltage drop amplitude, so as to support a voltage of the power grid, and the DC chopper turns on or turns off according to the bus voltage, so as to maintain an energy balance between the generator-side converter and the grid-side converter.

* * * * *